Patented Dec. 29, 1925.

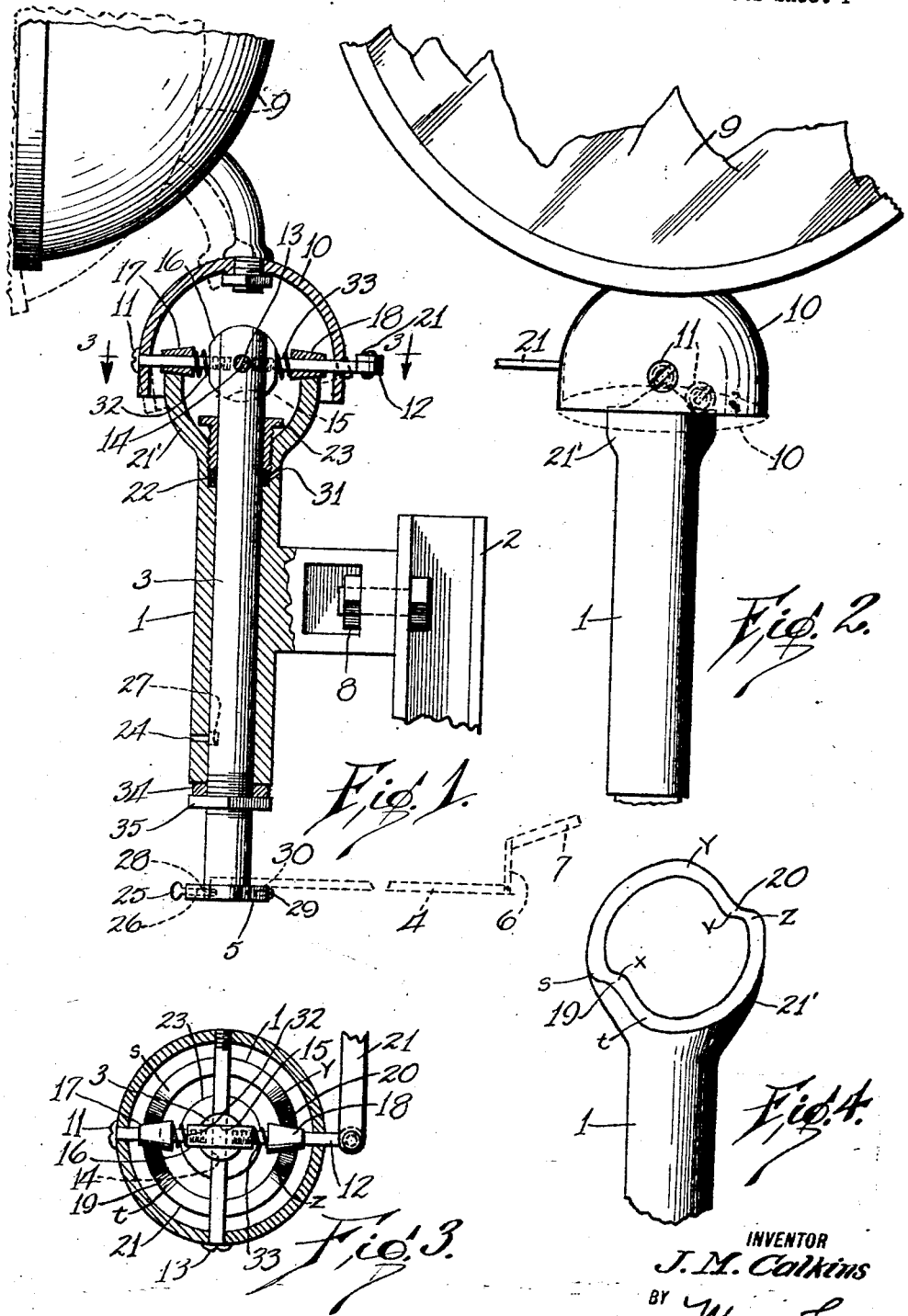

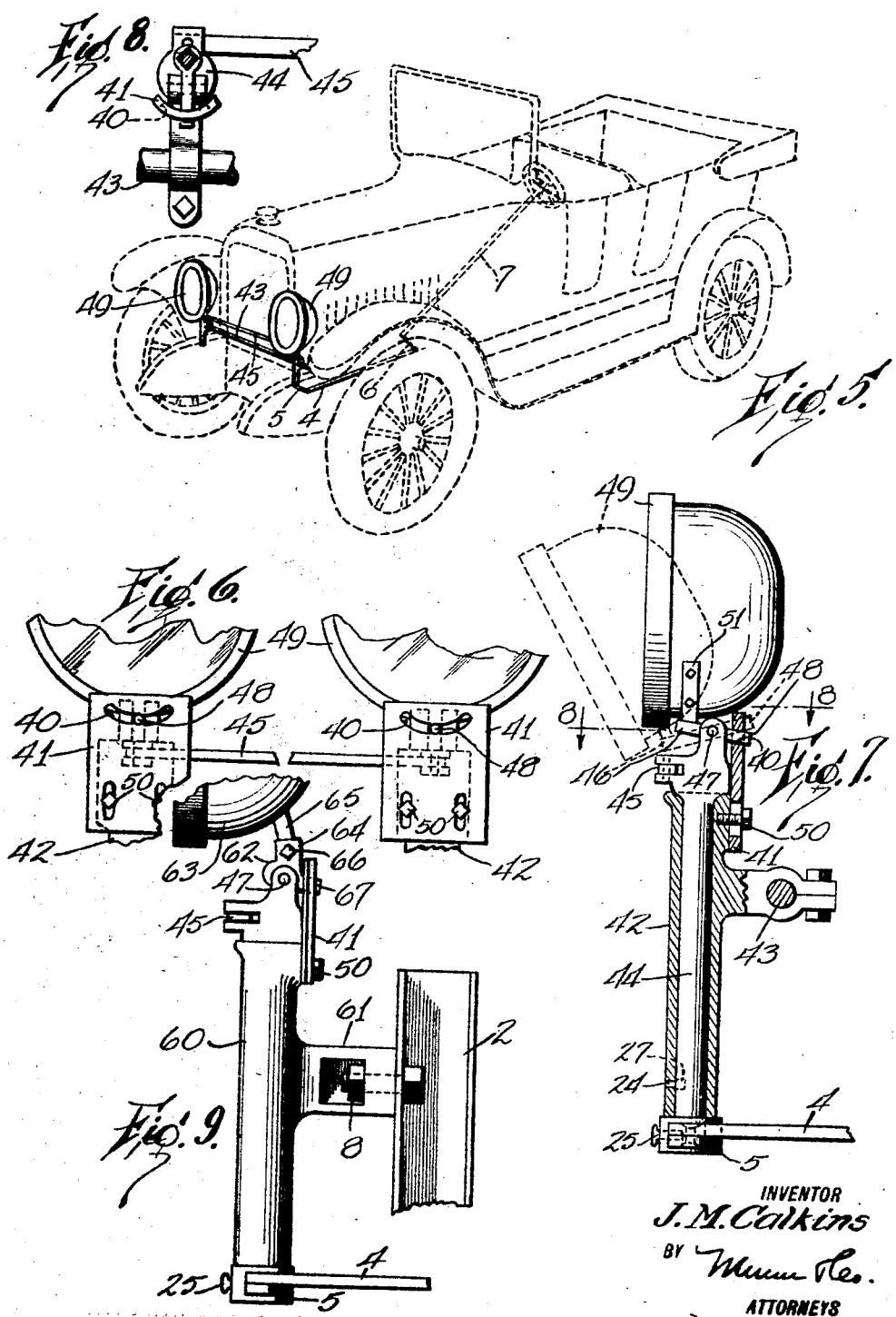

1,567,112

UNITED STATES PATENT OFFICE.

JAMES M. CALKINS, OF CHICAGO, ILLINOIS, ASSIGNOR TO SCOTT HEAD LAMP CONTROL, OF MIAMI, FLORIDA, A CORPORATION OF FLORIDA.

DIRIGIBLE HEADLIGHT FOR VEHICLES.

Application filed July 19, 1923. Serial No. 652,632.

*To all whom it may concern:*

Be it known that I, JAMES M. CALKINS, a citizen of the United States, and a resident of Chicago, in the county of Cook and State of Illinois, have invented a new and useful Improvement in Dirigible Headlights for Vehicles, of which the following is a full, clear, and exact description.

My invention relates to improvements in dirigible headlights for vehicles, and it consists in the combinations, constructions, and arrangements herein described and claimed.

An object of my invention is to provide a dirigible headlight for vehicles that is adapted to turn the headlights automatically when the steering wheel is turned, and to incline the headlights forward so as to throw the light upon the ground just in front of the vehicle and to the side in which the vehicle is turning.

A further object of my invention is to provide a device of the type described which may be operatively connected to or disconnected from the steering mechanism at will.

A further object of my invention is to provide a device of the type described in which the mechanism for turning the lights is entirely enclosed by a cover.

A further object of my invention is to provide a device of the type described which has novel means for automatically taking up the wear.

A further object of my invention is to provide a device of the type described which is simple in construction, durable and efficient for the purpose intended, and which may be readily attached to an automobile.

Other objects and advantages will appear in the following specification, and the novel features of the invention will be particularly pointed out in the appended claims.

My invention is illustrated in the accompanying drawings forming part of this invention, in which—

Figure 1 is a vertical section through the device,

Figure 2 is a front elevation of the device,

Figure 3 is a section along the line 3—3 of Figure 1,

Figure 4 is a perspective view of the supporting standard,

Figure 5 is a perspective view of a car, showing the means connecting the headlights with the steering mechanism, Figure 6 is a rear elevation of the modified form of the device shown in Fig. 5, Figure 7 is a vertical section through the modified form of the device, Figure 8 is a section along the line 8—8 of Figure 7, and Figure 9 is a side elevation of another modified form of the device.

In carrying out my invention I provide a supporting standard 1 that is adapted to be secured to the frame 2 of an automobile. A rod 3 is rotatably disposed within the support 1 and is connected to a link 4 by means of an arm 5. The arm 5 is loosely mounted upon the rod 3 so as to be rocked by the link 4 without operating the rod 3. The link 4 is connected to a steering wheel arm 6 of the steering wheel 7, (see Figures 1 and 5). The support 1 is secured to the frame 2 by means of a bolt 8 in the present form of the device. It is obvious, however, that the construction may be varied so as to secure the device to the car in any preferred manner.

The rod 3 is operatively connected to a headlight 9 so as to rotate the headlight in a horizontal plane when the rod 3 is oscillated. The headlight 9 is secured to a headlight carrying member such as a shell or cover 10 that in turn is operatively connected to the rod 3 by means of screws 11, 12, and 13. The screw 13 passes through the opening 14 in the rod 3 and acts as a pivot for the shell 10. In other words, the light 9 is adapted to rock on the rod 3 about the pivot 14. Means for tilting the light 4 forwardly when it is swung either to the right or to the left whereby the headlight is adapted to throw the light rays upon the road just in front of the car, is provided, and is clearly shown in Figure 1. The rod 3 is bifurcated at 15 and receives the plate 16. The plate 16 is pivotally carried by the screw-pin 13. The screws 11 and 12 are carried by the plate 16 and in turn carry cams, such as conical-shaped rollers 17 and 18. The rollers 17 and 18 engage with cam surfaces 19 and 20 respectively of an outwardly flared portion 21' of the support or standard 1. It is obvious from this construction that the rod 3 when oscillated will swing the rollers about the longitudinal axis of the rod as a center, the rollers riding upon the cam surfaces 19 and 20. It will be noted from Figure 4 that the cam surface 19 has its high point positioned directly in front of the standard, while the portions adjacent to this high point x slope downwardly. The cam 20 has two high points y and z that are disposed diametrically opposite the low points s and t of the cam 19. The cam 20 has a low point v that is disposed diametrically opposite the point x. When the rod 3 is oscillated the roller 17 will ride down upon the cam surface 19 to either of the low points s or t, while the roller 18 will move upwardly on the cam surface 20 to either of the high points y and z. It will therefore be observed that no matter in which direction the rod 3 is oscillated, the light will swing forwardly into the dotted line position shown in Figure 1.

The outward movement of the rollers 17 and the upward movement of the roller 18 causes the screw-pins 11 and 12 to swing about the screw 13 as an axis so as to swing the cover 10. It will be noted from Figures 1 and 3 that the pin 12 has a link 21 connected thereto, this link also being connected to the pin 12, (not shown) of the other headlight mechanism. A rotation of the rod 3 will therefore rotate the rod 3 in the other headlight mechanism. Both headlights will be swung in unison by the steering wheel. A packing 22 is disposed around the upper end of the rod 3 and is compressed in place by means of a nut 23.

From the foregoing description of the various parts of the device, the operation thereof may be readily understood. The support 1 has an opening 24 therein which is adapted to receive a set screw 25. The arm 5 has an opening 26 that is adapted to receive a set screw. The rod 3 has two recesses 27 and 28 therein adapted to register with the openings 24 and 26 when the rod 3 is disposed in a certain position with respect to the openings. When the set screw 25 is disposed in the opening 26 and the recess 28, the rod 3 and the headlight 9 will be actuated when the steering wheel is moved. However, when the set screw 25 is disposed in the opening 24 and the recess 27, the rod 3 is rigidly locked to the standard 1 and the arm 5 will merely rock freely upon the rod 3. The arm 5 can be held in adjusted position upon the rod 3 so as to be freely moved with respect thereto by any means such as a screw 29 that has its inner end slidably received in an annular groove 30 in the rod 3.

It is customary to keep the lights rigid when the automobile is being run in the day time. In this case the driver disposes the set screw 25 in the opening 24 and the recess 27. In the night driving, however, the driver wishes to have the lights 9 turn so as to throw the light upon the road that is disposed directly in front of his car. In this instance, the driver disposes the set screw 25 in the opening 26 and the recess 28. An oil hole 31 is provided in the standard 1 and communicates with the packing 22. The device may be kept in perfect running order by merely adding a few drops of oil to the packing 22 from time to time. The cams 19 and 20 are beveled slightly so as to conform to the conical-shaped rollers 17 and 18. Springs 32 and 33 bear against the rollers 17 and 18 so as to cause the rollers to automatically take up the wear between the rollers and the cams 19 and 20. This construction provides a rattleproof device.

In addition to the spring pressed rollers 17 and 18 I provide a spring washer 34 that bears against the under side of the standard 1 that is held in position by means of a nut 35. The nut 35 is threaded upon the rod 3. By turning the nut 35 the rod 3 may be pulled downwardly so as to cause the rollers 17 and 18 to firmly contact with the cams 19 and 20. It is obvious from this construction that as soon as the rollers 17 and 18 have been moved to their outermost position by means of the springs 32 and 33, a mere tightening of the nut 35 will move the rod 3 downwardly a sufficient distance to move the rollers 17 and 18 to their innermost positions. The rollers 17 and 18 are now ready to take up additional wear that might occur between the rollers 17 and 18 and the cams 19 and 20.

In Figures 5 to 8 inclusive I have shown a modified form of the device. This form is in many respects the same as the preferred form of the device, except that a cam slot 40 is provided in place of the cams 19 and 20. The slot 40 is in a plate 41 that is adjustably secured to a headlight standard 42. The standard 42 is carried by a rod 43 that in turn is secured to the fenders of the car. A rod 44 is rotatably mounted in the standard 42 and is actuated by means of the link 4 and crank arm 5 in the same manner as described in the preferred form of the device. The set screw 25 operatively connects the rod 44 to the standard 42 or to the arm 5. The rod 44 in each of the standards 42 is connected to the other by means of a link 45. The rod 44 also carries a plate 46 that is pivotally secured to the rod 44 at 47. The plate 46 has a finger 48 that is slidably received in the cam slot 40. The plate 46 carries the headlight 49 by means of a bracket 51 which connects the headlight to the plate. From this construction it will be apparent that when the rod 44 is oscillated the plate 46 will also be oscillated so as to cause the pin 48 to slide in the slot 40. The movement of the pin in the slot causes the plate to swing so as to tilt the light 49 forwardly and into the dotted line position shown in Figure 7.

The operation of this form of the device is similar to the operation of the preferred form. The lights 49 are swung in a horizontal plane and are also tilted forwardly while being swung so as to throw the light upon the road that is just before the car. In some States, it is necessary to have the lights inclined slightly forwardly even though the lights are in normal position. This can be readily accomplished by merely moving the plates 41 upwardly a slight distance and then securing the plates in adjusted position by means of the bolts 50. It will be noted from Figure 8 that the plates 41 are curved so as to always have the pin 48 disposed in the slot 40.

In Figure 9 I have shown another slightly modified form of the form shown in Figures 5 to 8 inclusive. In this form of the device, the standard 60 is provided with a lug 61 that is secured to the frame of the car 2 instead of to the rod 43. The plate 62 that carries the light 63 differs from the plate 46 in that it is provided with a socket 64 in place of the bracket 51 of the plate 46. The rod 65 of the light 63 is disposed in the socket 64 and is held in place by means of the set screw 66. The plate 62 has a pin 67 that is slidably received in the slot 40 of the plate 41 in identically the same manner as that shown in Figure 7. This form of the device operates identically in the same manner as the form shown in Figures 5 to 8 inclusive and therefore needs no further description.

All three forms of the device disclosed in the present application have but one object, that is, to swing the lights when the steering wheel is actuated, and to tilt the lights forwardly so as to throw the light on the ground that is just in front of the automobile.

I claim:

1. A dirigible headlight construction for vehicles having a steering mechanism, headlight supporting standards carried by said vehicle and having cam surfaces, headlight carrying members having a universal connection with each standard, a cam carried by said members for swinging said lights downwardly when said members are rotated, means for automatically moving said cams to take up wear, and means connecting said members with said steering mechanism, whereby said members are rotated when said steering mechanism is actuated.

2. A dirigible headlight construction for vehicles comprising a headlight supporting standard having a cam surface, a rod rotatably carried by said standard, a headlight carrying member pivotally secured to said rod, cams carried by said member and engaging with the cam surface so as to swing said member downwardly when said rod is rotated, and means for automatically moving said cams so as to take up wear.

3. A dirigible headlight construction for vehicles comprising headlight supporting standards having cam surfaces, a rod rotatably carried by each standard, a headlight carrying member pivotally secured to each rod, conical shaped rollers carried by said members and engaging with the cam surfaces for swinging said members downwardly when said rods are rotated, means for connecting said rods with the steering mechanism, and means for moving said rollers to automatically take up wear.

4. A dirigible headlight construction for vehicles comprising headlight supporting standards having cam surfaces, a rod rotatably carried by each standard, a headlight carrying member pivotally secured to each rod, conical shaped rollers carried by said members and engaging with the cam surfaces for swinging said members downwardly when said rods are rotated, means for connecting said rods with the steering mechanism, and means for moving said rollers to automatically take up wear, said last named means comprising springs bearing against said rollers and being adapted to move said rollers longitudinally.

JAMES M. CALKINS.